(12) United States Patent
Maehara et al.

(10) Patent No.: US 9,488,234 B2
(45) Date of Patent: Nov. 8, 2016

(54) DRUM BRAKE APPARATUS

(71) Applicant: AKEBONO BRAKE INDUSTRY CO., LTD., Tokyo (JP)

(72) Inventors: Toshifumi Maehara, Tokyo (JP); Hiroaki Nakamura, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/416,779

(22) PCT Filed: Jul. 24, 2013

(86) PCT No.: PCT/JP2013/070083
§ 371 (c)(1),
(2) Date: Jan. 23, 2015

(87) PCT Pub. No.: WO2014/017552
PCT Pub. Date: Jan. 30, 2014

(65) Prior Publication Data
US 2015/0176664 A1    Jun. 25, 2015

(30) Foreign Application Priority Data

Jul. 25, 2012 (JP) .................................. 2012-165005
May 17, 2013 (JP) .................................. 2013-105237

(51) Int. Cl.
*F16D 51/28* (2006.01)
*F16D 51/24* (2006.01)
(Continued)

(52) U.S. Cl.
CPC .............. *F16D 51/28* (2013.01); *F16D 51/24* (2013.01); *F16D 51/30* (2013.01); *F16D 51/50* (2013.01); *F16D 65/14* (2013.01); *F16D 65/22* (2013.01);
(Continued)

(58) Field of Classification Search
CPC .... F16D 65/22; F16D 65/561; F16D 65/562; F16D 65/563; F16D 51/26; F16D 51/28
USPC .......... 188/79.51, 79.54, 79.55, 79.56, 79.63
See application file for complete search history.

(56) References Cited

U.S. PATENT DOCUMENTS 3,708,044 A    1/1973   Torri et al.
5,553,691 A    9/1996   Mery et al.
(Continued)

FOREIGN PATENT DOCUMENTS

CN    1094489 A    11/1994
CN    1147292 A    4/1997
(Continued)

OTHER PUBLICATIONS

Extended European Search Report issued on Jun. 1, 2016 in corresponding European patent application 13822767.3 (7 pages).
(Continued)

*Primary Examiner* — Thomas J Williams
(74) *Attorney, Agent, or Firm* — Drinker Biddle & Reath LLP

(57) ABSTRACT

A drum brake apparatus includes first and second brake shoes, a wheel cylinder, an anchor portion, an adjuster, an expansion mechanism for expanding the first and second brake shoes, a switch lever mechanism rotatable by an action force of a given or higher value from the expansion mechanism, and a switch strut, following the rotation of the switch lever mechanism, for expanding the anchor-portion side adjoining ends of the first and second brake shoes.

4 Claims, 15 Drawing Sheets

(51) Int. Cl.
*F16D 65/56* (2006.01)
*F16D 51/50* (2006.01)
*F16D 65/14* (2006.01)
*F16D 65/22* (2006.01)
*F16D 51/30* (2006.01)
*F16D 121/04* (2012.01)

(52) U.S. Cl.
CPC ......... *F16D 65/562* (2013.01); *F16D 2121/04* (2013.01)

(56) References Cited

U.S. PATENT DOCUMENTS

| | | | |
|---|---|---|---|
| 5,630,486 A | 5/1997 | Maligne | |
| 6,044,938 A | 4/2000 | Yabusaki et al. | |
| 6,206,148 B1 * | 3/2001 | Capek | F16D 65/22 188/327 |
| 6,374,962 B1 * | 4/2002 | Doolittle | F16D 65/22 188/106 F |
| 6,390,248 B1 * | 5/2002 | Ikeda | F16D 51/24 188/328 |
| 2002/0014378 A1 | 2/2002 | Ikeda | |
| 2003/0024779 A1 | 2/2003 | Mizuno et al. | |
| 2003/0150676 A1 | 8/2003 | Ohnishi et al. | |
| 2012/0205209 A1 | 8/2012 | Tsuzuku et al. | |

FOREIGN PATENT DOCUMENTS

| | | | |
|---|---|---|---|
| CN | 102245925 A | 11/2011 | |
| EP | 2497968 A1 * | 9/2012 | F16D 51/20 |
| JP | B-S50-020659 | 7/1975 | |
| JP | H08-502579 A | 3/1996 | |
| JP | H10-508680 A | 8/1998 | |
| JP | 2001-343037 A | 12/2001 | |
| JP | A-2010-173588 | 8/2010 | |

OTHER PUBLICATIONS

CN Office Action dated Apr. 6, 2016 from corresponding Chinese patent application No. 201380039765.X (with attached English-language translation).

* cited by examiner

DRUM BRAKE APPARATUS

TECHNICAL FIELD

The invention relates to a drum brake apparatus.

BACKGROUND ART

There is known a drum brake apparatus having a dual mode structure which, in service braking, by operating a hydraulic cylinder device, operates as a leading trailing (LT) type drum brake apparatus and, in parking braking, by operating a parking brake lever, operates as a duo servo (DS) type drum brake apparatus (see the patent document 1).

A dual mode drum brake apparatus 501 of this type shown in FIG. 15 includes a pair of first and second shoes 503 and 505 disposed opposed to each other on the inner peripheral surface of a brake drum (not shown). The first and second shoes 503 and 505 are elastically supported on a backing plate 511 by first and second shoe hold devices 507 and 509 such that they are movable relative to each other within a limited range. They are also elastically energized in their mutually approaching directions by a pair of first and second return springs 513 and 515. The adjoining ends of the first and second shoes 503 and 505 existing downward in FIG. 15 are respectively contacted with an anchor 517 fixed to the backing plate 511. The adjoining ends of the first and second shoes 503 and 505 existing upward in FIG. 15 can be pressed respectively by the first and second pistons 521 and 523 of a wheel cylinder 519 serving as a hydraulic actuator mounted on the backing plate 511, whereby the first and second shoes 503 and 505 can be expanded.

On the end side of the second shoe 505 existing near the wheel cylinder 519, a forward-pull type first parking brake lever 529 is pivotally supported on a second web 525 through a pin 527. The first parking brake lever 529 constituting this mechanical actuator (expansion mechanism) is rotatable within a plane perpendicular to the axis of the drum. To the free end 531 of the first parking brake lever 529, there is connected a parking brake cable (not shown). When the parking brake cable is pulled by a parking brake operation force, the free end 531 of the first parking brake lever 529 is displaced in a direction shown by W. Thus, the first parking lever 529 can be rotated around the pin 527 in its corresponding direction.

On the one hand, for expanding the second shoe 505 through the pin 527 around its contact point with the anchor 517 and, on the other hand, for rotating a second parking brake lever 535 through a strut 533 clockwise around a projection 537, the first parking brake lever 529 constitutes an expansion mechanism for expanding the first shoe 503 through the projection 537 around its contact point with the anchor 517.

The ends of the first and second shoes 503 and 505 existing backward in the drum rotation direction are dragged by the brake drum and the drum rotation force is transmitted through the strut 533 to the first and second shoes 503 and 505 and is received by the anchor 517, whereby, in parking braking, the dual-mode drum brake apparatus 501 operates as a duo-servo type drum brake.

CITATION LIST

Patent Document

[Patent Document 1] Japanese Patent Publication No. 2001-343037

SUMMARY OF INVENTION

Technical Problem

However, in the dual-mode drum brake apparatus 501, in order to function as a duo-servo type drum brake in parking braking, the first parking brake lever 529 constituting the expansion mechanism, on the one hand, expands the second shoe 505 around its contact point with the anchor 517 through the pin 527 and, on the other hand, in order to rotate the second parking brake lever 535 through the strut 533, expands the first shoe 503 around its contact point with the anchor 517 through the projection 537. Thus, the strut 533 pressed by the first parking brake lever 529 presses the second parking brake lever 535. However, in this case, since the first shoe 503 is rotatably engaged with the second parking brake lever 535 and projection 537 serving as the center of rotation, for contact with the anchor 517, the load of the first shoe return spring 513 must be larger than that of the second shoe return spring 515. This increases the contact forces of the first and second shoes 503 and 505 with the anchor 517. Therefore, when, for stabilizing a braking force in service braking, the anchor 517 contactable by the adjoining ends of the first and second shoes 503 and 505 existing downward in FIG. 15 is inclined, there is a fear that the second and first shoes 505 and 503 can be moved toward the wheel cylinder 519 by vibrations and the like in traveling, thereby causing dragging.

The invention is made in view of the above circumstances and thus it is an object of the invention to provide a drum brake apparatus which can enhance the stability of the parking braking force in a dual-mode brake structure.

Solution to Problem

The above object of the invention can be attained by the following structures.

(1) A drum brake apparatus, comprising:

a pair of brake shoes disposed opposed to each other on an inner peripheral surface of a brake drum and elastically supported movably on a backing plate;

a wheel cylinder interposed between a one-side adjoining ends of the paired brake shoes for expanding the paired brake shoes respectively;

an anchor portion fixed to the backing plate and contactable by the other-side adjoining ends of the paired brake shoes;

an adjuster interposed between the one-side adjoining ends of the paired brake shoes existing near the wheel cylinder for adjusting a shoe clearance;

an expansion mechanism arranged in series with the adjuster and, on receiving an operation force, for expanding the paired brake shoes respectively;

a switch lever mechanism rotatably mounted on one of the brake shoes and rotatable by an action force of a given or higher value from the expansion mechanism; and a switch strut mounted between the anchor-portion side adjoining ends of the paired brake shoes and, following the rotation of the switch lever mechanism, for expanding the anchor-portion side adjoining ends of the paired brake shoes.

According to the drum brake apparatus of the (1) structure, in parking braking, the one-side adjoining ends of the paired brake shoes are expanded by an input from the expansion mechanism. The expanded one-side adjoining ends of the paired brake shoes are contacted with the inner peripheral surface of the brake drum and a reaction force from the inner peripheral surface acts on the paired brake shoes. When the action force (expansion force) of the expansion mechanism reaches a given value or higher, the switch lever mechanism expands the anchor-portion side adjoining ends of the paired brake shoes through the switch strut to thereby press them against the inner peripheral surface of the brake drum.

In other words, until the reaction force from the inner peripheral surface of the brake drum acts on the brake shoe on the adjuster installation side, the switch lever mechanism provided for mode switching cannot be rotated by the brake shoe expansion operation for parking braking, that is, the mode switch mechanism cannot be operated. Thus, after the one-side adjoining ends of the paired brake shoes are expanded and contacted with the inner peripheral surface of the brake drum by the action force of the expansion mechanism, the switch lever mechanism expands the anchor-portion side adjoining ends of the paired brake shoes to thereby bring them into contact with the inner peripheral surface of the brake drum, thereby enhancing adhesiveness between the brake shoes and drum slide surface.

Therefore, after end of parking operation, the paired brake shoes are expanded on both of the wheel cylinder side and anchor portion side, thereby enhancing their adhesiveness to the drum slide surface. As a result, in parking braking, a high parking brake force as a duo servo structure can be obtained and the loosened states of the brake shoes occurring when the parking brake force is generated can be prevented.

(2) The drum brake apparatus having the (1) structure, wherein the switch lever mechanism includes a pair of hold portions bent formed for holding the first web of the one of the brake shoes, and the paired hold portions are rotatably supported on the first web.

According to the drum brake apparatus having the (2) structure, in the switch lever mechanism, the paired hold portions respectively disposed on the front and back surfaces of the first web are rotatably supported. Thus, when the switch lever mechanism is rotated, an unbalanced load can be prevented from acting on the first web, thereby enabling smooth rotation.

(3) The drum brake apparatus having the (1) structure, wherein, a side end of the switch lever mechanism engageable with the expansion mechanism and a side end thereof engageable with the switch strut are bent formed such that they are disposed opposed to each other across the first web of one of the brake shoes.

According to the drum brake apparatus having the (3) structure, when the adjuster is disposed opposed to the backing plate across the first web, on the anchor portion side, for prevention of interference with the parking brake cable or the like for operating the expansion mechanism, the side end of the switch lever mechanism engageable with the switch strut is disposed on the opposite side of the backing plate. Also, on the wheel cylinder side, for prevention of interference with the adjuster, the side end engageable with the expansion mechanism is disposed on the backing plate side. This can facilitate the mounting of the switch lever mechanism onto the first web.

(4) The drum brake apparatus having the (1) structure, wherein the switch lever mechanism includes a first switch lever rotatably supported on one of the brake shoes by a first fulcrum pin for serving as an input side, and a second switch lever rotatably supported on the one of the brake shoes by a second fulcrum pin and rotatable following the first switch lever for serving as an output side rotatable following the first switch lever; and, the first switch lever receives an action force from the expansion mechanism between a slide contact point of the first switch lever and the second switch lever and the first fulcrum pin.

According to the drum brake apparatus having the (4) structure, the first and second switch levers constituting the switch lever mechanism provided for mode switching are reduced in their amounts of displacement at their slide contact points in transmission of the action force. This makes it hard for a problem such as wear to occur. Also, in the first and second switch levers, by setting the positions of the first and second fulcrum pins and the mutual slide contact point positions of the first and second switch levers, the selection of the proper transmission ratio of the first and second switch levers can be facilitated, whereby the optimum adhesiveness of the paired brake shoes to the drum slide surface is easy to obtain. Further, in the first and second switch levers, the positions of the first and second fulcrum pins and the lengths of the levers can be set properly, thereby enhancing the freedom of layout of the switch lever mechanism within the brake drum.

(5) The drum brake apparatus having the (4) structure, wherein the second switch lever includes a pair of hold portions bent formed for holding the first web of the one of the brake shoes therebetween, and the paired hold portions are rotatably supported on the first web.

According to the drum brake apparatus having the (5) structure, the paired hold portions of the second switch lever respectively existing on the front and back surfaces of the first web are rotatably supported. This can prevent an unbalanced load from acting on the first web when the second switch lever is rotated, smooth rotation is possible.

(6) A drum brake apparatus having the (4) structure, wherein a side end of the second switch lever contactable with the first switch lever and a side end thereof contactable with the switch strut are bent formed such that they are disposed opposed to each other across the first web of one of the brake shoes.

According to the drum brake apparatus having the (6) structure, when the adjuster is disposed opposed to the backing plate across the first web, on the anchor portion side, for prevention of interference with the parking brake cable or the like for operating the expansion mechanism, the side end of the second switch lever contactable with the switch strut is disposed on the opposite side of the backing plate. Also, on the wheel cylinder side, for prevention of interference with the adjuster, the first switch lever is disposed on the backing plate side and the side end of the second switch lever contactable with the first switch lever is disposed on the backing plate side. This can facilitate the mounting of the first and second switch levers onto the first web.

(7) A drum brake apparatus having any one of the (1) to (6) structures, wherein a drive mechanism for pulling a parking cable connected to the expansion mechanism is provided on a back surface of the backing plate.

According to the drum brake apparatus having the (7) structure, when the parking cable is pulled by the drive mechanism provided on the back surface of the backing plate, the expansion mechanism can be operated electrically. And, in parking braking, since the apparatus serves as a duo servo apparatus, a high effect (power saving) can be realized.

The invention has been described briefly heretofore. When the below-mentioned mode for carrying out the invention (which is hereinafter called "embodiments") is read though with reference to the accompanying drawings, the invention can be specified further.

DESCRIPTION OF EMBODIMENT

Description is given below of embodiments according to the invention with reference to the accompanying drawings.

Figure 1:
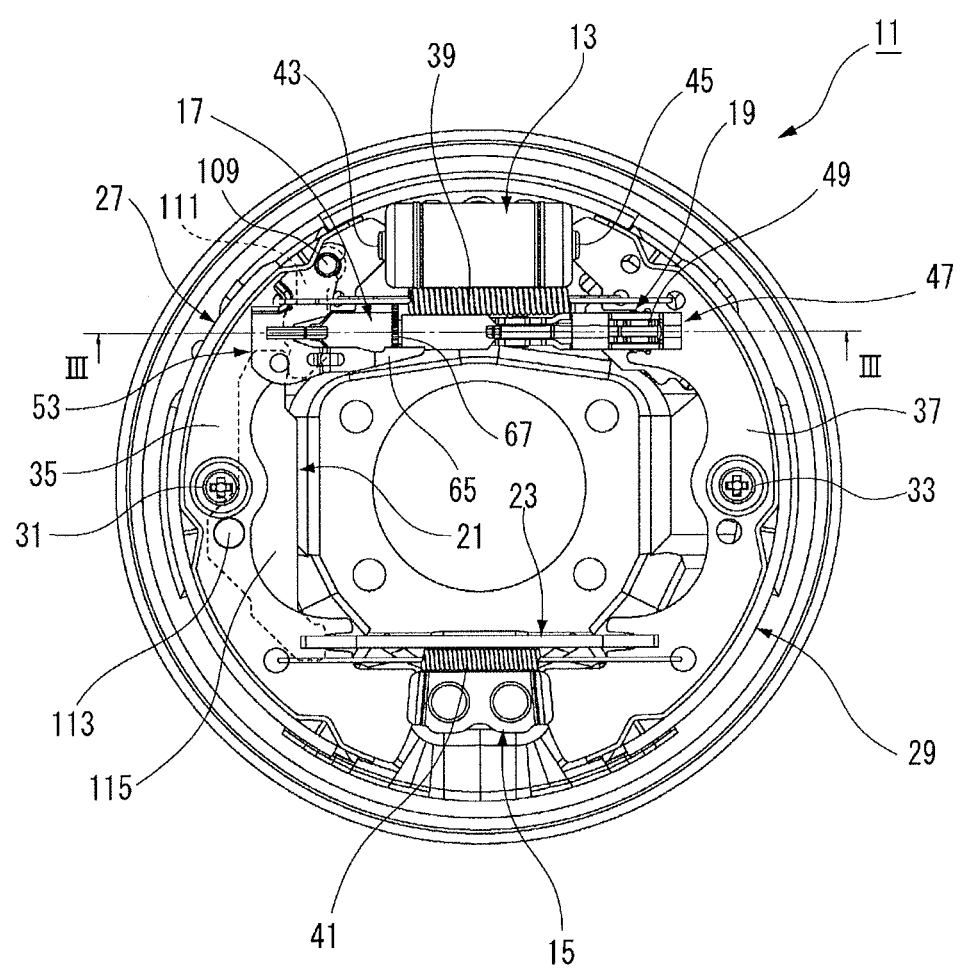
FIG. 1 is a front view of a drum brake apparatus (cross-pull type) according to a first embodiment of the invention.
Figure 2A:
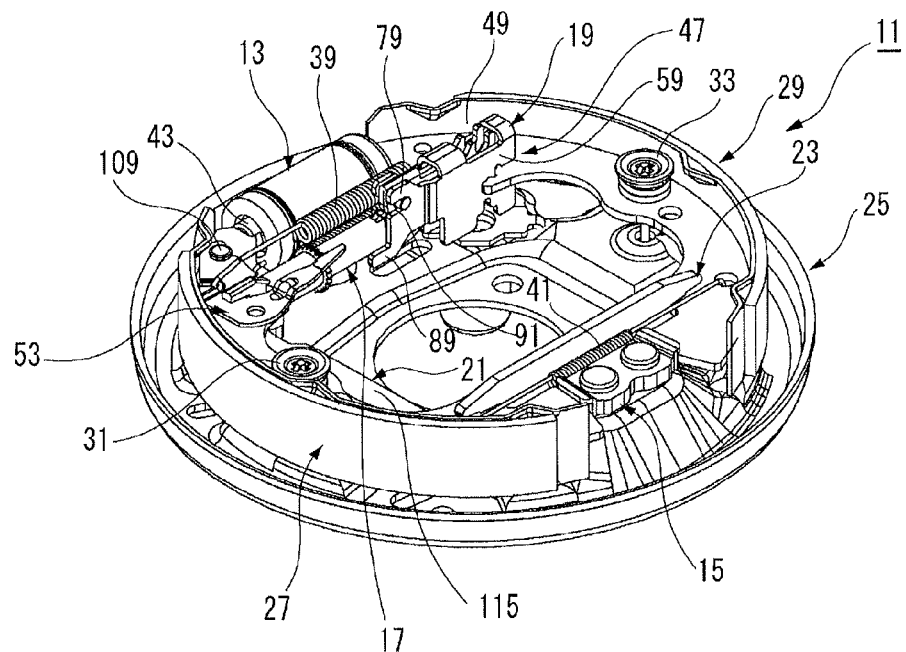
FIG. 2A is a perspective view of the front side of the drum brake apparatus shown in FIG. 1.
Figure 2B:
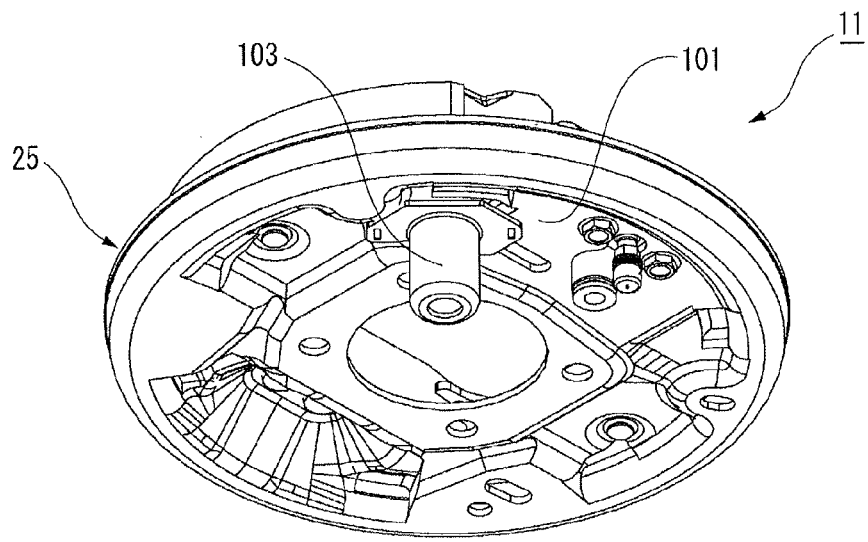
FIG. 2B is a perspective view of the back side of the drum brake apparatus shown in FIG. 1.

As shown in FIGS. 1 to 2B, a drum brake apparatus 11 according to a first embodiment of the invention mainly consists of a pair of brake shoes which are a first brake shoe 27 and a second brake shoe 29, a wheel cylinder 13, an anchor portion 15, an adjuster 17, a cross-pull type expansion mechanism 19, a switch lever mechanism 21, and a switch strut 23.

The drum brake apparatus 11 is integrally fixed to a vehicle body in the attitude that a backing plate 25 is substantially perpendicular to the rotation axis of a wheel (not shown). The substantially arc-shaped paired first and second brake shoes 27 and 29 are vertically disposed substantially along the right and left outer peripheral edges of the backing plate 25.

In the respective first and second brake shoes 27 and 29, a first web 35 and a second web 37 are elastically supported by a first shoe hold device 31 and a second shoe hold device 33 so as to be movable, thereby enabling the brake shoes to expand. Also, the first and second brake shoes 27 and 29 are elastically energized in their mutually approaching directions by paired pair of a first shoe return spring 39 and a second shoe return spring 41.

Between the one-side adjoining ends of the first and second brake shoes 27 and 29 existing upward in FIG. 1, there is interposed the wheel cylinder 13 serving as a hydraulic actuator. The wheel cylinder 13 is mounted on the backing plate 25 and, using a first piston 43 and a second piston 45, presses the one-side adjoining ends in their mutually separating directions to expand the first and second brake shoes 27 and 29. The other-side adjoining ends of the first and second brake shoes 27 and 29 existing downward in FIG. 1 are respectively contacted with the fixed anchor portion 15 mounted on the backing plate 25.

In service braking provided by stepping down a foot brake pedal, with pressure operation of the wheel cylinder 13, the first and second pistons 43 and 45 are advanced from the two ends thereof to rotate and expand the first and second brake shoes 27 and 29 from the positions of FIG. 1 to around their contact points with the anchor portion 15. Thus, the first and second brake shoes 27 and 29 are friction engaged with the inner peripheral surface of a brake drum (not shown) to brake it. In this case, one of the first and second brake shoes 27 and 29 provides a leading shoe with respect to the rotation direction of the brake drum and thus has a self-servo property, whereas the other provides a trailing shoe with respect to the rotation direction of the brake drum and thus does not have a self-servo property. Thus, the drum brake apparatus 11 acts as a leading-trailing type drum brake.

Between the adjoining ends of the first and second brake shoes 27 and 29 existing near the wheel cylinder 13, there is interposed an adjuster 17 for adjusting a clearance between the shoes. In series to the adjuster 17, there is connected an expansion mechanism 19 which, when an operation force is input into the backing plate 25 perpendicularly through a parking cable 51, expands the first and second brake shoes 27 and 29 respectively. The adjuster 17 and expansion mechanism 19 constitute an adjuster-equipped parking lever assembly 47.

Figure 3:
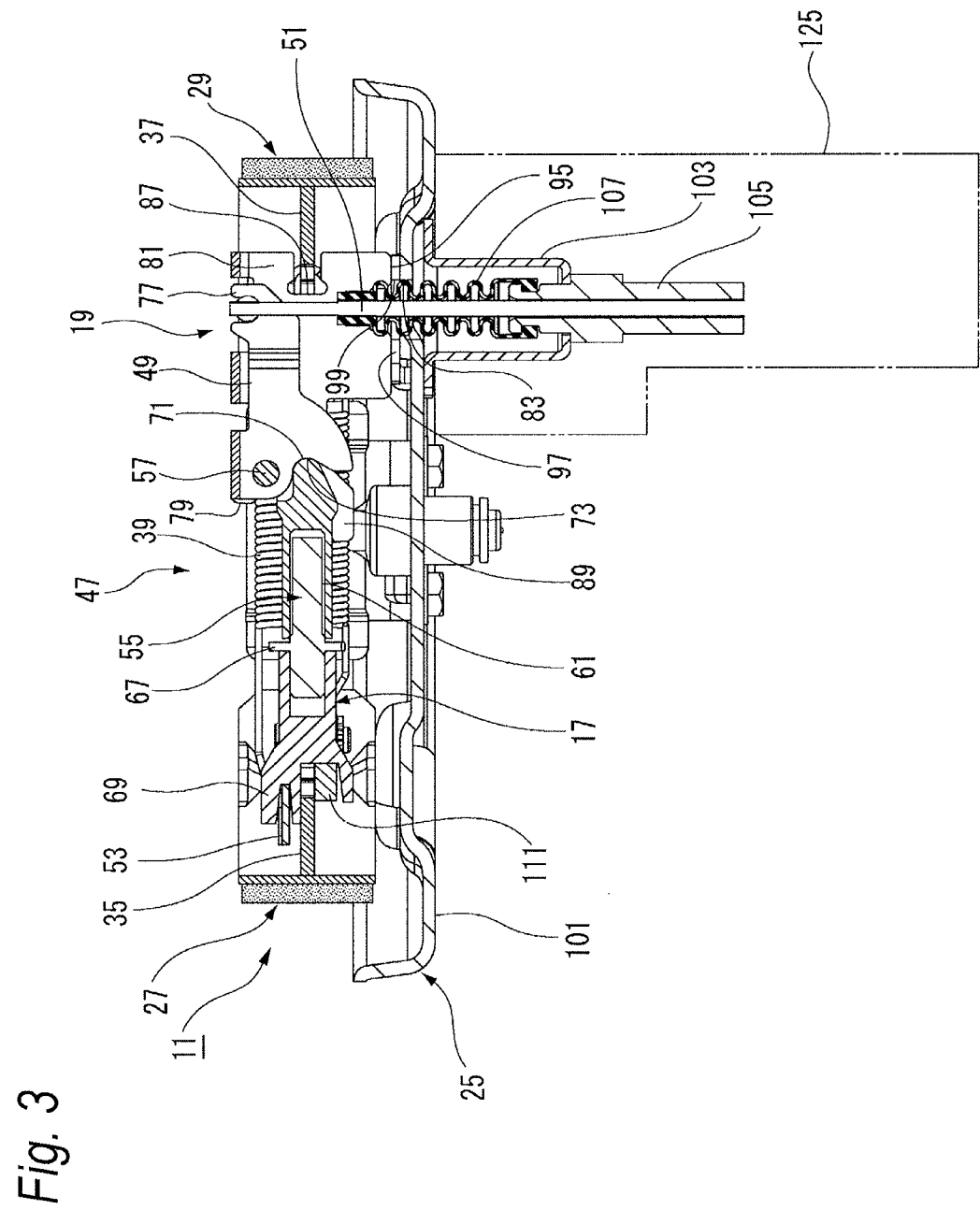
FIG. 3 is a section view taken along the arrow of FIG. 1.
Figure 4A:
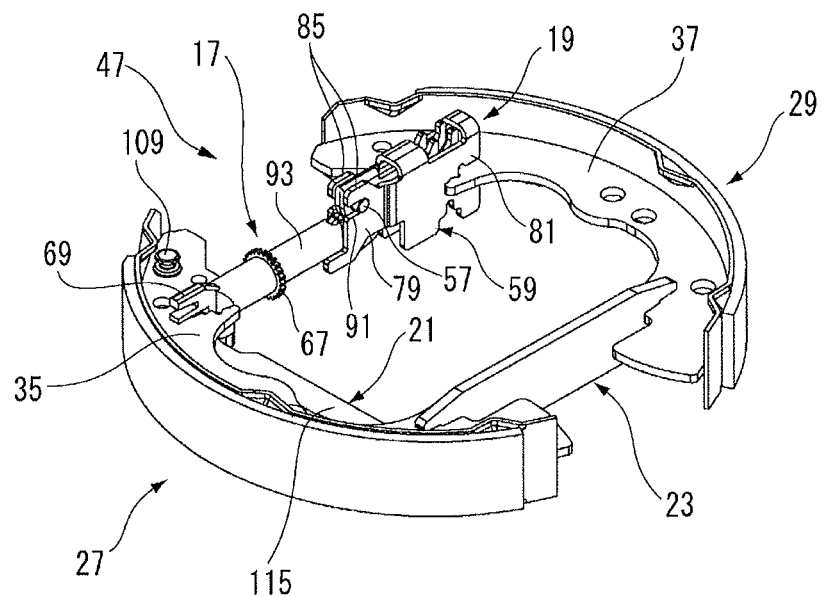
FIG. 4A is a perspective view of main portions of the drum brake apparatus shown in FIG. 2A.
Figure 4B:
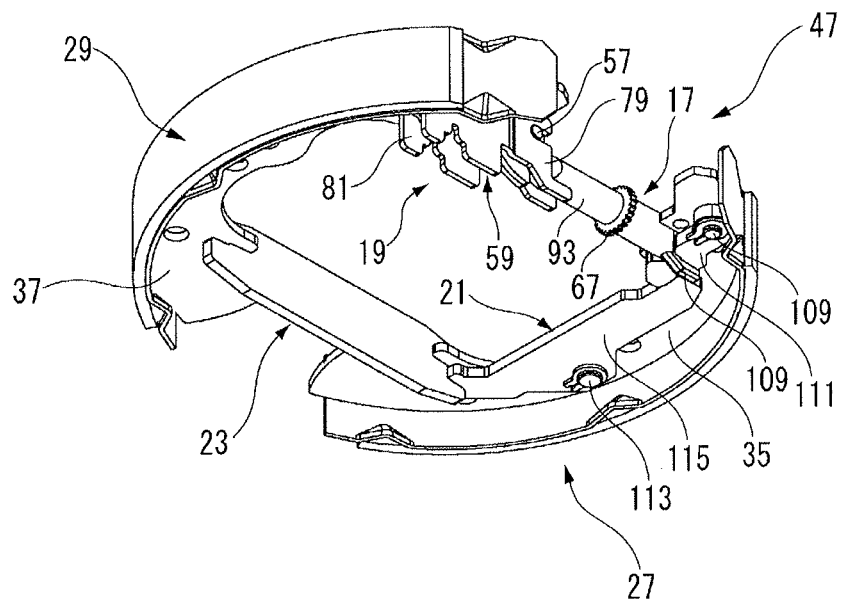
FIG. 4B is a perspective view of the drum brake apparatus shown in FIG. 4A, when viewed from behind.

As shown in FIG. 3, the adjuster-equipped parking lever assembly 47 is disposed to extend between the one-side adjoining ends of the first and second brake shoes 27 and 29 and, when a parking lever 49 is rotated in one direction, moves the paired first and second brake shoes 27 and 29 mechanically away from each other. To the parking lever 49, there is connected the parking cable 51 which, according to the operation force of the parking brake operation, rotates the parking lever 49 in one direction.

The adjuster-equipped parking lever assembly 47 includes the adjuster 17 and expansion mechanism 19. Further, the adjuster 17 includes an adjuster lever 53 (see FIG. 1) and a strut 55. Meanwhile, the expansion mechanism 19 includes a lever pin 57, a parking lever 49 and a bracket 59. The adjuster 17 has a shoe clearance automatic adjust mechanism and can be axially expanded and compressed by an adjuster screw 61 (see FIG. 3).

The adjuster lever 53 is pivotally supported by a first fulcrum pin 109 (see FIG. 1) such that it can be rotated to the first web 35 of the first brake shoe 27. Between the adjuster lever 53 and the second brake shoe 29, there is stretched the first return spring 39 which energizes the adjuster lever 53 to rotate counterclockwise in FIG. 1. This rotation energization also causes the arm portion 65 of the adjuster lever 53 to rotate and engage with the toothed wheel 67 of the strut 55.

One end side (in FIG. 3, the left side) of the strut 55 across the adjuster screw 61 provides an adjuster socket 69, whereas the other end side (in FIG. 3, the right side portion) provides an engagement plate portion 71. The adjuster socket 69 is contacted with the first web 35 of the first brake shoe 27. The engagement plate portion 71 is engaged with a recessed contact portion 73 constituting the rotation portion of the parking lever 49. The parking lever 49 has, above the recessed contact portion 73, a pin engagement hole 75 for insertion of the lever pin 57 serving as a rotation fulcrum. The parking lever 49 also has a cable engagement portion 77 on the opposite side (the side to be driven by the parking cable 51) to the recessed contact portion 73.

And, in the adjuster-equipped parking lever assembly 47, the lever pin 57 serving as the rotation fulcrum of the parking lever 49 is disposed on the expansion mechanism central side (in FIG. 3, the central side in the right and left direction). Meanwhile, the side to be driven by the parking cable 51 of the parking lever 49 is disposed near the second brake shoe 29 side. The bracket 59, one end portion 79 of which holds the lever pin 57 serving as the rotation fulcrum of the parking lever 49 and the other end portion 81 of which is contacted with the second brake shoe 29, is slidably contacted with the backing plate 25 side on its both sides across an insertion hole 83 (see FIG. 3) serving as a portion for pulling out the parking cable 51.

The bracket 59 of the first embodiment includes two plate portions 85 across the parking lever 49. The bracket other end portion 81 includes an engagement recess 87 which can be contacted with the second web 37 of the second brake shoe 29. The bracket one end portion 79 includes, on its side for holding the lever pin 57, a projection 89 which constitutes a removal preventive mechanism for preventing the other end portion of the strut 55 from being removed from the recessed contact portion 73 of the parking lever 49. Above the projection portion 89, there is formed an elliptic hold groove 91 for holding the lever pin 57. The width of the projection 89 side of the bracket 59 is narrower than the outside diameter of the cylindrical portion 93 of the strut. Thus, the strut cylindrical portion 93 is locked to the projection 89 of the bracket 59, thereby preventing the engagement plate portion 71 from being removed from the recessed contact portion 73.

In the parking lever 49 with the lever pin 57 inserted therein, the engagement plate portion 71 of the strut 55 is engaged with the recessed contact portion 73. The parking lever 49 engaged with the strut 55 is inserted between the paired plate portions 85 of the bracket 59. The parking lever 49 inserted into the bracket 59 is rotated about the lever pin 57 with the lever pin 57 supported in the elliptic hold groove 91.

The backing plate side contact portion 95 (see FIG. 3) of the bracket 59 is contacted with the backing plate 25 directly or through a contact member. In the first embodiment, the backing plate side contact portion 95 is contacted with the backing plate 25 through the lever plate 97 (see FIG. 3) used as a contact member. The backing plate 25 includes, as the pull-out portion of the parking cable 51, an insertion hole 83 (see FIG. 3) for insertion of the parking cable 51. On the wheel-side surface of the backing plate 25, there is mounted the lever plate 97 such that it is superposed on the insertion hole 83, while the lever plate 97 has a penetration hole 99 (see FIG. 3) coincident with the insertion hole 83.

On the back surface 101 of the backing plate 25, there is disposed a cable anchor 103 which is concentric with the insertion hole 83 and serves as a parking cable anchor member. To the leading end of the cable anchor 103, there is concentrically fixed a cable case 105, while the parking cable 51 guided from the cable case 105 is moved through the insertion hole 83 and penetration hole 99 and is locked to the parking lever 49. Within the cable anchor 103, cable boots 107 (see FIG. 3) are fixed to the cable case 105, while the parking cable 51 is inserted within the cable boots 107.

The cable anchor 103 to be fixed to the backing plate 25 is disposed while it is sandwiched between the backing plate 25 and cable case 105. Since the parking cable 51 is pulled downward in FIG. 3, the cable case 105 inputs into the cable anchor 103 an upward force serving as a reaction force. Thus, the cable action force is received by the backing plate 25 in its plate thickness direction and in directions which face and approach each other across the cable anchor 103, thereby providing an advantageous structure in the mounting strength of the cable anchor 103.

Further, as shown in FIGS. 4A to 5B, on one brake shoe, namely, the first brake shoe 27 of the drum brake apparatus 11, there is rotatably provided a switch lever mechanism 21. The switch lever mechanism 21 can be rotated by a given or stronger action force (expansion force) of the expansion mechanism 19. Also, a switch strut 23 is interposed between the anchor-portion-15 side adjoining ends of the first and second brake shoes 27 and 29. The switch strut 23 follows the rotation of the switch lever mechanism 21 to expand the anchor-portion-15 side adjoining ends of the first and second brake shoes 27 and 29 against the energizing force of the second shoe return spring 41.

Figure 5A:
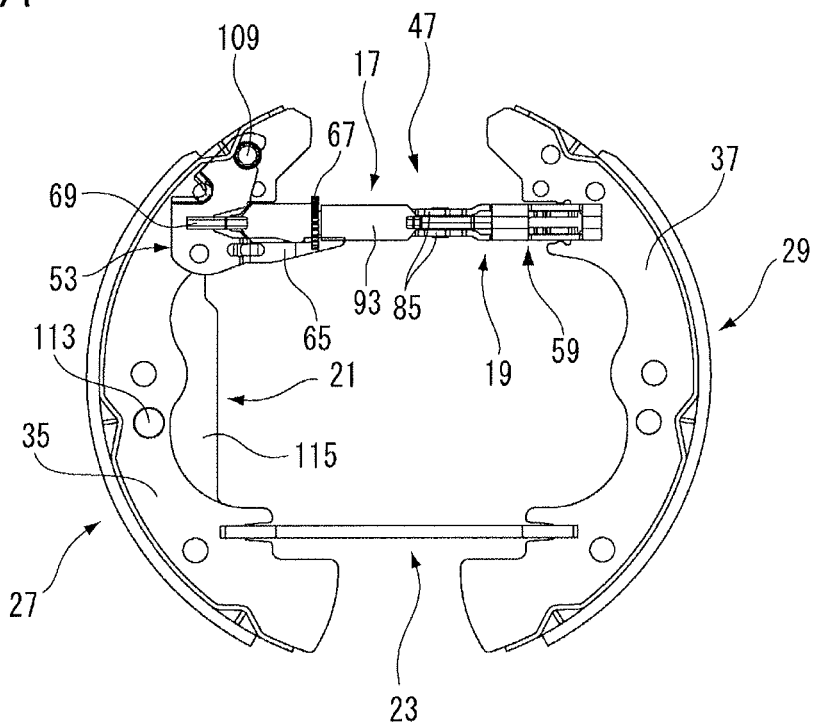
FIG. 5A is a front view of main portions of the brake drum apparatus shown in FIG. 4A, when viewed from front.
Figure 5B:
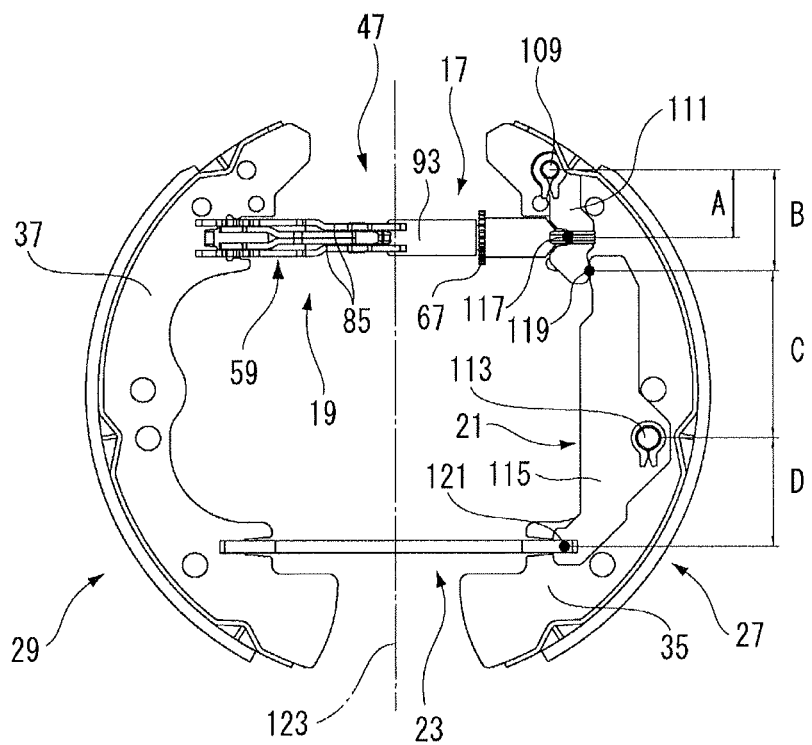
FIG. 5B is a back view of the brake drum apparatus shown in FIG. 5A, when viewed from behind.

In the first embodiment, the switch lever mechanism 21, as shown in FIGS. 5A and 5B, includes a first switch lever 111 serving as its input side supported rotatably on one end side (wheel cylinder 13 side) of the first brake shoe 27 by a first fulcrum pin 109, and a second switch lever 115 serving as its output side supported rotatably by a second fulcrum pin 113 on the substantially middle portion of the first brake shoe 27 and rotatable following the first switch lever 111. The first switch lever 111 receives an action force from the expansion mechanism 19 between the slide contact points of the first switch lever 111 and the second switch lever 115 and the first fulcrum pin 109.

In the first and second switch levers 111 and 115, the distances between a fulcrum point, a force point and an action point are set such that, when they are rotated by a given or stronger action force of the expansion mechanism 19, the switch strut 23 following the rotation of the first and second switch levers 111 and 115 expand the anchor-portion-15 side adjoining ends of the first and second brake shoes 27 and 29 against the energizing force of the second shoe return spring 41.

In the first embodiment, while the operation member is not in operation, as shown in FIG. 5B, the adjuster socket 69 and first switch lever 111 are contacted at a first slide contact point 117, the first switch lever 111 and second switch lever 115 are contacted at a second slide contact point 119, and the second switch lever 115 and switch strut 23 are contacted at a third slide contact point 121.

The distance between the first fulcrum pin 109 and first slide contact point 117 along the direction of a virtual center line 123 dividing right and left into two the backing plate 25 with the first and second brake shoes 27 and 29 disposed right and left in FIG. 5B is expressed as A, the distance between the first fulcrum pin 109 and second slide contact point 119 along the direction of the virtual line 123 is expressed as B, the distance between the second slide contact point 119 and second fulcrum pin 113 along the direction of the virtual center line 123 is expressed as C, and the distance between the second fulcrum pin 113 and third slide contact point 121 along the direction of the virtual center line 123 is expressed as D. Therefore, the respective distances can be expressed by $1<3(A/B)(C/D)$. Thus, after the wheel-cylinder-13 sides of the first and second brake shoes 27 and 29 are first expanded by an input from the expansion mechanism 19 and are then contacted with the inner peripheral surface of the brake drum to determine the positions of the first and second brake shoes 27 and 29, when a reaction force from the inner peripheral surface acts on the first and second brake shoes 27 and 29 and the action force (expansion force) of the expansion mechanism 19 reaches a given value or higher, the first and second switch levers 111 and 115 are rotated to transmit the action force to the switch strut 23.

Next, description is given of the operation of the drum brake apparatus 11 having the above structure.

In the drum brake apparatus 11 of the first embodiment, in the state before the parking operation, when the parking cable 51 is pulled according to the operation of an operation member (such as an operation lever), in the early operation stage, the wheel-cylinder-13 side adjoining ends of the first and second brake shoes 27 and 29 are first expanded by the adjuster-equipped parking lever assembly 47 to thereby determine the positions of the first and second brake shoes 27 and 29.

Next, the wheel-cylinder-13 side adjoining ends of the first and second brake shoes 27 and 29 expanded through the adjuster 17 are contacted with the inner peripheral surface of the brake drum and the reaction force from the inner peripheral surface acts on the first and second brake shoes 27 and 29. When the action force (expansion force) of the expansion mechanism 19 reaches a given level or more, the first switch lever 111 is rotated to press the second switch lever 115. Thus, the second switch lever 115 is rotated about the second fulcrum pin 113 counterclockwise in FIG. 1. As a result, the second switch lever 115 presses the second brake shoe 29 through the switch strut 23. Thus, the anchor-portion-15 side adjoining ends of the first and second brake shoes 27 and 29 are expanded and pressed against the inner peripheral surface of the brake drum.

In other words, until the reaction force from the inner peripheral surface of the brake drum acts on the first and second brakes shoes 27 and 29 on the adjuster 17 installation side, the switch lever mechanism 21 constituted of the first and second switch levers 111 and 115 cannot be rotated by the expansion operation of the first and second brake shoes 27 and 29 to be executed by the cross-pull type expansion mechanism 19 for parking brake, that is, the mode switch mechanism cannot be operated. Thus, after the wheel-cylinder-13 side adjoining ends of side adjoining ends of the first and second brake shoes 27 and 29 are expanded and pressed against the inner peripheral surface of the brake drum by the action force of the expansion mechanism 19, the anchor-portion-15 side adjoining ends of the brake shoes 27 and 29 are expanded and pressed against the inner peripheral surface of the brake drum by the switch lever mechanism 21. This can enhance the adhesiveness of the first and second brake shoes 27 and 29 to the drum slide surface.

Therefore, in the drum brake apparatus 11 of the first embodiment, at the end of parking operation, the first and second brake shoes 27 and 29 are expanded on both of the wheel-cylinder-13 side and anchor-portion-15 side, thereby enhancing their adhesiveness to the drum slide surface. As a result, in parking braking, a high parking brake force as a duo servo structure can be obtained and the loosened states of the brake shoes occurring when the parking brake force is generated can be prevented.

Also, in the first and second switch levers 111 and 115 constituting the switch lever mechanism 21 provided for mode switch, in transmission of the action force, the displacement amounts of the respective first to third slide contact points 117, 119 and 121 are reduced. This makes it hard for a problem such as wear to occur. And, in the first and second switch levers 111 and 115, by setting the positions of the first and second fulcrum pins 109 and 113 and the positions of the first to third slide contact points 117, 119 and 121 where the switch levers 111 and 115 are contacted with each other, a proper transmission ratio of the switch levers 111 and 115 can be selected easily, thereby facilitating setting of the optimum adhesiveness of the first and second brake shoes 27 and 29 to the drum slide surface. Further, in the first and second switch levers 111 and 115, the positions of the first and second fulcrum pins 109 and 113 and the respective lengths of the first and second switch levers 111 and 115 can be set properly, which can enhance the freedom of layout of the switch lever mechanism 21 within the brake drum.

When the drum brake apparatus 11 of the first embodiment is equipped with a motor gear unit 125 (see FIG. 3) which is disposed on the back surface 101 of the backing plate 25 for pulling the parking cable 51 connected to the expansion mechanism 19 and thus serves as a drive mechanism, it can act as a drum brake apparatus having an electric parking brake.

According to the drum brake apparatus 11, when the parking cable 51 is pulled by the motor gear unit 125 disposed on the back surface 101 of the backing plate 25, the expansion mechanism 19 can be operated electrically. And, as described above, in parking braking, since it acts as a duo-servo type drum brake, a high effect (power saving) can be realized.

Therefore, according to the drum brake apparatus 11 of the first embodiment, there can be inexpensively provided a dual-mode brake structure which functions as a leading/trailing type brake in service braking and as a duo-servo type brake in parking braking.

Also, according to the drum brake apparatus 11 of the first embodiment, parking braking can be easily electrified.

Next, description is given of a drum brake apparatus 210 according to a second embodiment of the invention.

As shown in FIGS. 6 to 9, a drum brake apparatus 210 of the second embodiment, similarly to the drum brake apparatus 11 of the first embodiment, has a dual-mode brake structure. Here, the equivalent composing elements to those of the drum brake apparatus 11 of the first embodiment are given the same designations and thus the duplicate description thereof is omitted.

The drum brake apparatus 210 of the second embodiment uses, instead of the cross-pull type expansion mechanism 19 shown in the first embodiment, a forward-pull type expansion mechanism 219, while an adjuster 217 is connected in series to the expansion mechanism 219. The adjuster 217 and expansion mechanism 219 constitute an adjuster-equipped parking lever assembly 247.

Figure 6:
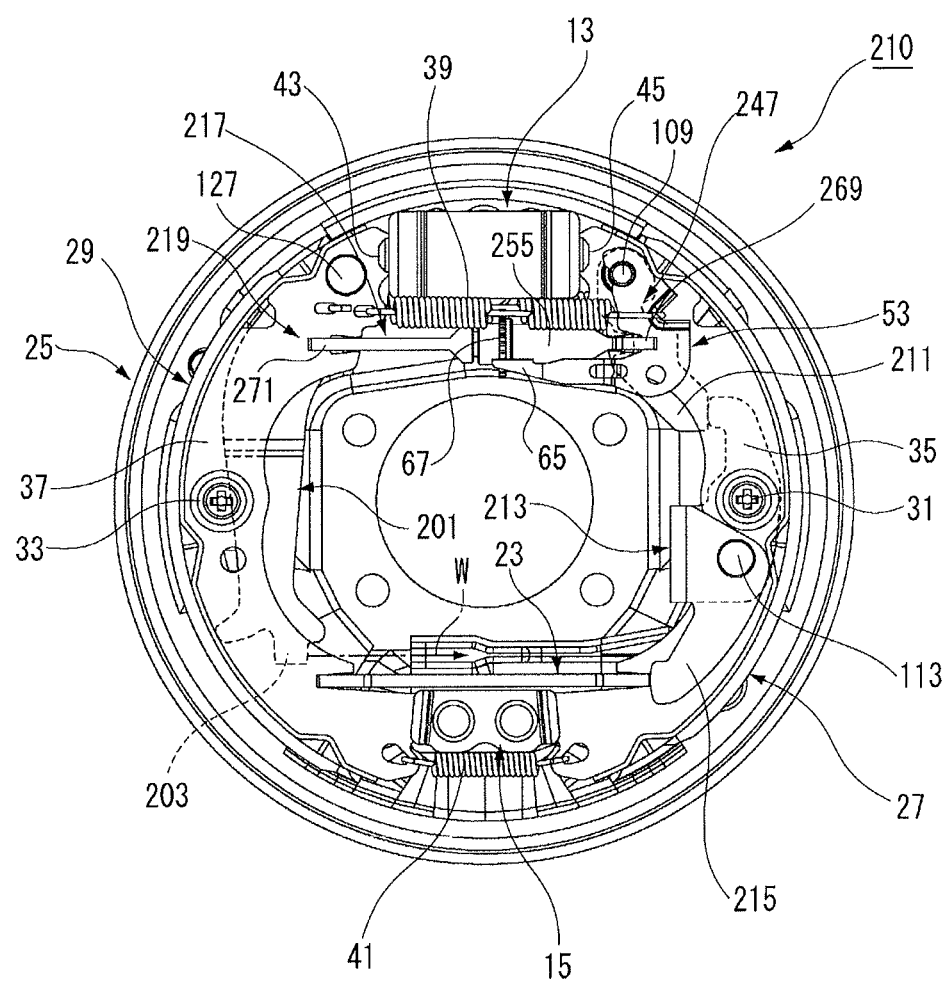
FIG. 6 is a front view of a drum brake apparatus (forward-pull type) according to a second embodiment of the invention.
Figure 7:
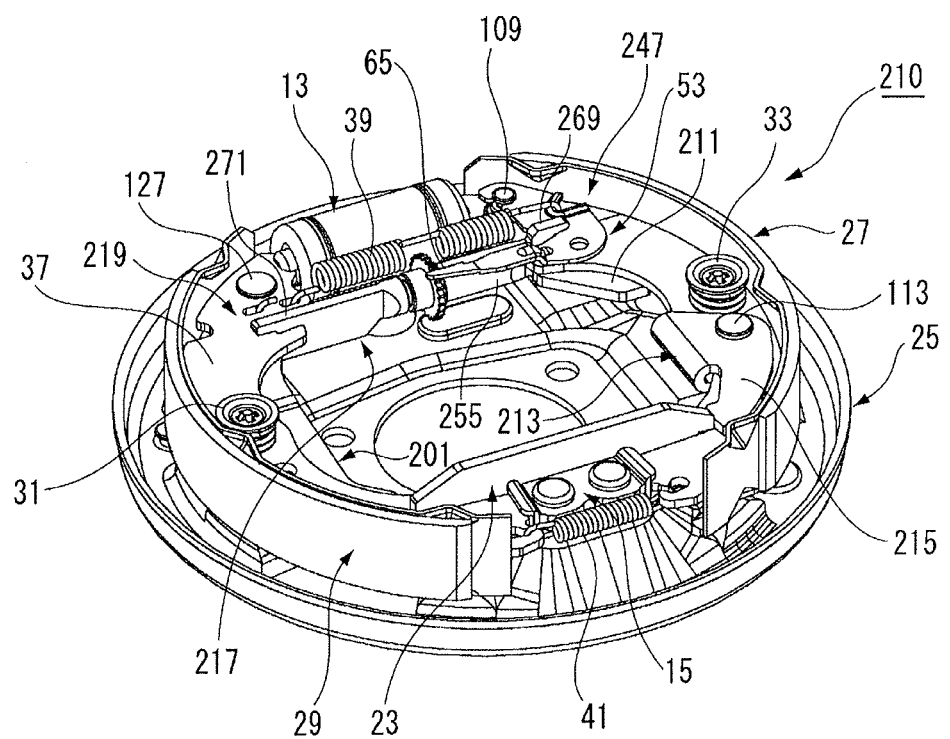
FIG. 7 is a perspective view of the front side of the drum brake apparatus shown in FIG. 6.

As shown in FIGS. 6 and 7, the adjuster-equipped parking lever assembly 247 extends between one-side of adjoining ends of the first and second brake shoes 27 and 29 and, when the parking brake lever 201 is rotated in one direction, the paired first and second brake shoes 27 and 29 are mechanically moved away from each other.

The parking brake lever 201, on its end side existing near the wheel cylinder 13 of the second brake shoe 29, is pivotally supported through a pin 127 on the second web 37 so as to be rotatable within a plane perpendicular to the axis of the drum. To the free end 203 of the parking brake lever 201, there is connected a parking brake cable (not shown) and, by towing the parking brake cable using a parking brake operation force, the free end 203 of the parking brake lever 201 is displaced in a direction shown by W. Thus, the parking brake lever 201 constitutes the forward-pull type expansion mechanism 219 which, on the one hand, expands the second brake shoe 29 through the pin 127 around its contact point with the anchor portion 15 and, on the other hand, expands the first brake shoe 27 through the adjuster 217 around its contact point with the anchor portion 15.

Figure 10:
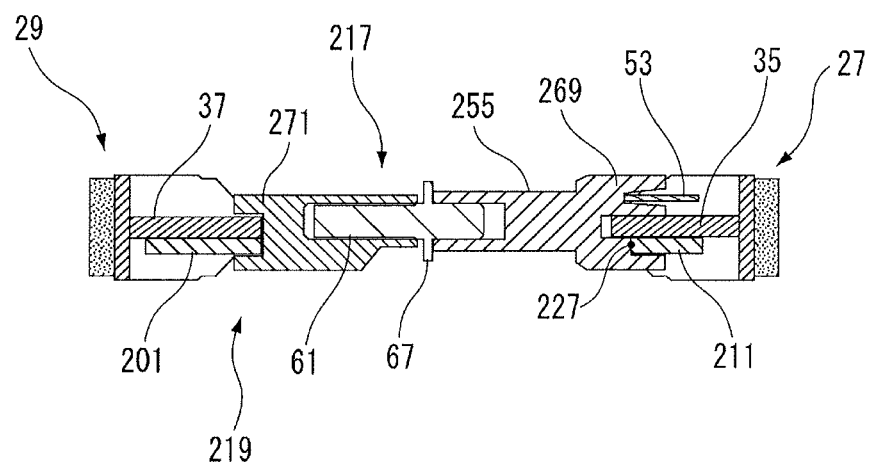
FIG. 10 is a section view taken along the arrow X-X of FIG. 9.

The adjuster 217 has an adjuster lever 53 and a strut 255 to thereby provide a shoe clearance automatic adjust mechanism and can be expanded and compressed axially by an adjuster screw 61 (see FIG. 10).

The one end side (in FIG. 10, right end side) of the strut 255 across the adjuster screw 61 is formed as an adjuster socket 269 which can be engaged with the first web 35 of the first brake shoe 27. Also, the other end side (in FIG. 10, left end side) of the strut 255 across the adjuster screw 61 is formed as an engagement plate portion 271 which can be engaged with the second web 37 of the second brake shoe 29.

Figure 8A:
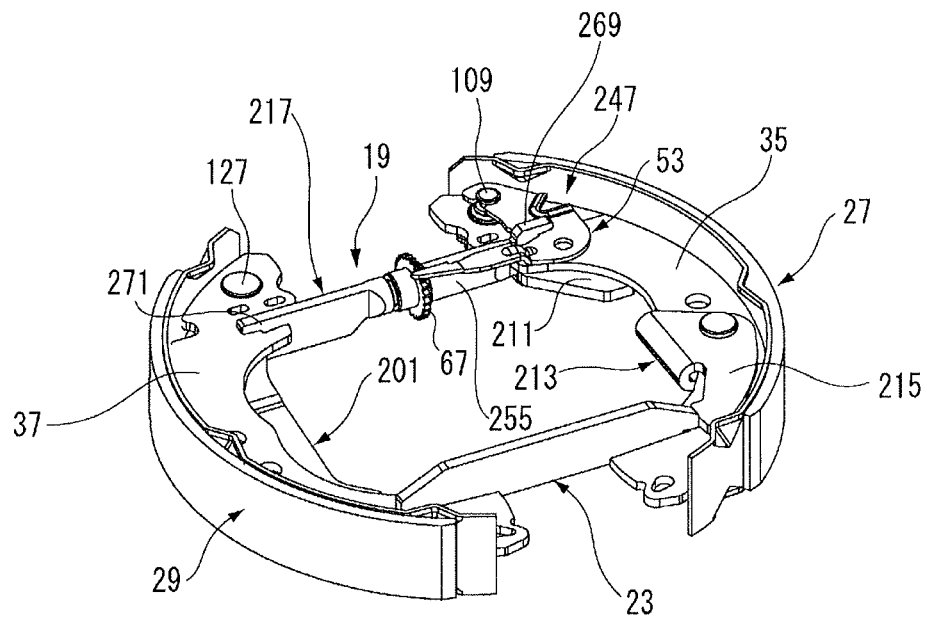
FIG. 8A is a perspective view of main portions of the drum brake apparatus shown in FIG. 7.
Figure 8B:
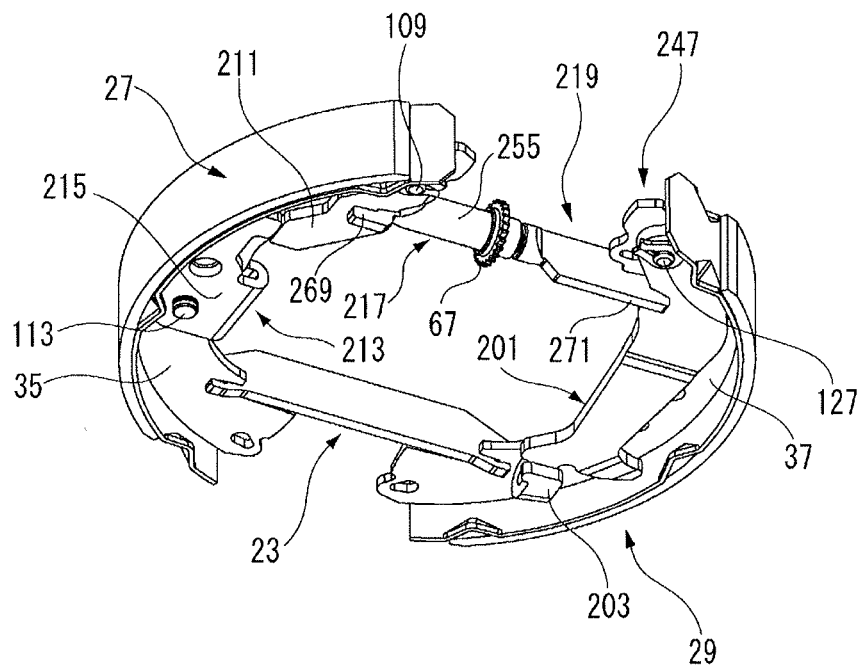
FIG. 8B is a perspective view of the drum brake apparatus shown in FIG. 8A, when viewed from behind.
Figure 9:
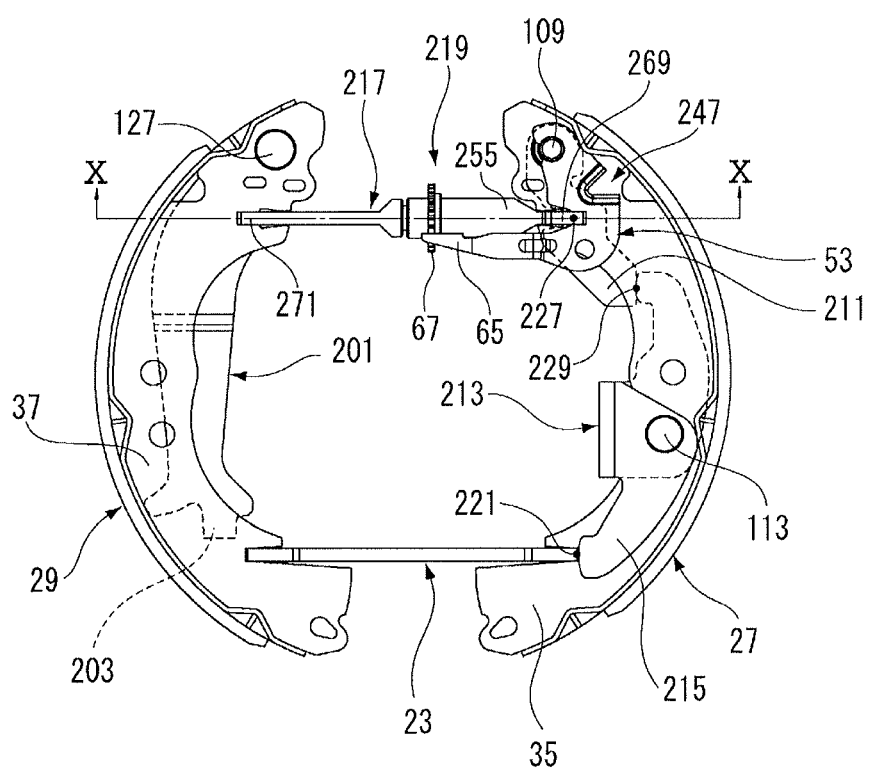
FIG. 9 is a front view of main portions of the drum brake apparatus shown in FIG. 8A, when viewed from front.

Further, as shown in FIGS. 8A to 9, in the drum brake apparatus 210, the first brake shoe 27 serving as one brake shoe includes a rotatable switch lever mechanism 213 which can be rotated by a given or higher action force (expansion force) of the expansion mechanism 219. Also, between the anchor-portion-15 side adjoining ends of the first and second brake shoes 27 and 29, there is interposed a switch strut 23. The switch strut 23 is actuated following the rotation of the switch lever mechanism 213 to expand the anchor-portion-15 side adjoining ends of the first and second brake shoes 27 and 29 against the energizing force of the second shoe return spring 41.

In the second embodiment, the switch lever mechanism 213, as shown in FIGS. 8A and 8B, includes a first switch lever 211 which is rotatably supported by a first fulcrum pin 109 on one end side (wheel cylinder 13 side) of the first brake shoe 27 and serves as an input side, and a second switch lever 215 which is rotatably supported by a second fulcrum pin 113 on the substantially middle portion of the first brake shoe 27 and can be rotated following the first switch lever 211 and serves as an output side. The first switch lever 211 receives an action force from the expansion mechanism 219 between the slide contact point of the first and second switch levers 211 and 215 and first fulcrum pin 109.

In the first and second switch levers 211 and 215, the distances between a fulcrum, a point of force and a point of action are set such that, when they are rotated by a given or higher action force of the expansion mechanism 219, the switch strut 23 following the rotation of the first and second switch levers 211 and 215 expands the anchor-portion-15 side adjoining ends of the first and second brake shoes 27 and 29 against the energizing force of the second shoe return spring 41.

In the second embodiment, while an operation member is not in operation, as shown in FIG. 9, the adjuster socket 269 and first switch lever 211 are contacted with each other at a first slide contact point 227, the first and second switch levers 211 and 215 are contacted at a second slide contact point 229, and the second switch lever 215 and switch strut 23 are contacted at a third slide contact point 221. Here, the second switch lever 215 of the second embodiment is mounted such that its side end 215a contactable with the first switch lever 211 is bent formed to extend along the back side of the first web 35 and its side end 215b contactable with the switch strut 23 is bent formed to extend along the surface side of the first web 35 to thereby hold the first web 35 between them (see FIG. 11).

Thus, in the drum brake apparatus 210 of the second embodiment, after the wheel-cylinder-13 sides of the first and second brake shoes 27 and 29 are first expanded by an input from the expansion mechanism 219 and are contacted with the inner peripheral surface of the brake drum and thus the positions of these brake shoes 27 and 29 are determined, when a reaction force from the inner peripheral surface acts on the brake shoes 27 and 29 and thus the action force (expansion force) of the expansion mechanism 219 reaches a given or higher value, the first and second switch levers 211 and 215 are rotated to transmit the action force to the switch strut 23.

Figure 11:
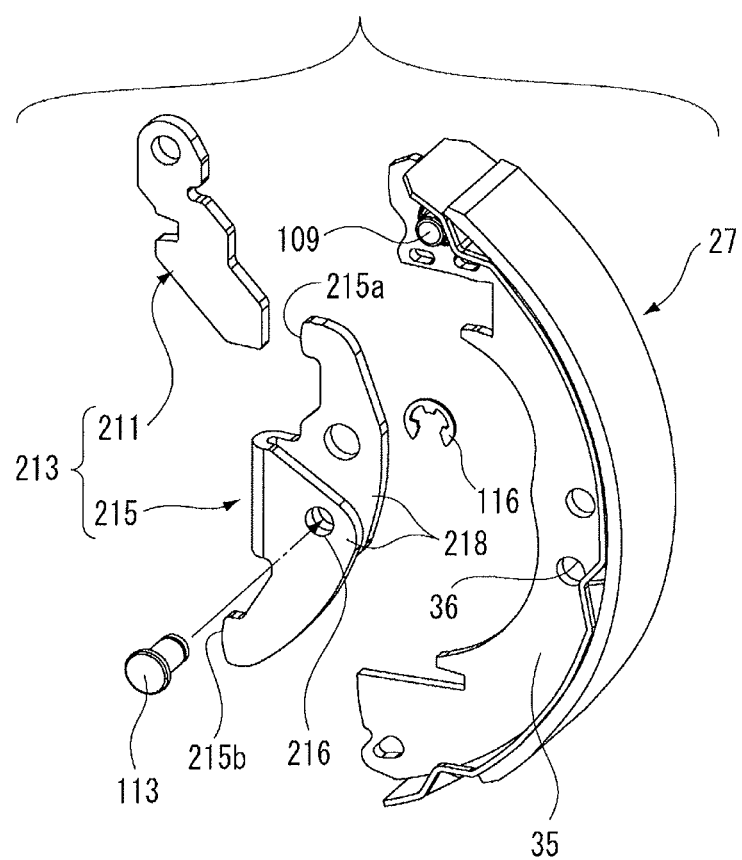
FIG. 11 is an exploded perspective view of main portions of the drum brake apparatus shown in FIG. 9.

Here, in the second switch lever 215 of the second embodiment, as shown in FIG. 11, the side end 215a contactable with the first switch lever 211 and side end 215b contactable with the switch strut 23 are bent formed such that they are opposed to each other across the first web 35.

Thus, as shown in FIG. 6, when the adjuster 217 is disposed opposed to the backing plate 25 across the first web 35, on the anchor portion 15 side, for prevention of interference with a parking brake cable connected to the parking brake lever 201 for operating the expansion mechanism 219, the side end 215b contactable with the switch strut 23 is disposed on the opposite side of the backing plate 25. Also, on the wheel cylinder 13 side, for prevention of interference with the adjuster lever 53, the first switch lever 211 is disposed on the backing plate 25 side and the side end 215b of the second switch lever 215 contactable with the first switch lever 211 is disposed on the backing plate 25 side. Thus, the first and second switch levers 211 and 215 can be easily mounted onto the first web 35.

Further, the second switch lever 215 of the second embodiment includes a pair of hold portions 218 bent formed for holding the first web 35 between them and is rotatably supported on the first web 35 by a second fulcrum pin 113 inserted into the penetration holes 216 of the paired hold portions 218 and the support holes 36 of the first web 35. And, the penetration end of the second fulcrum pin 113 penetrated through the hold portions 218 is prevented by a C clip 116 against removal.

Thus, the paired hold portions 218 of the second switch lever 215 respectively situated on the surface and back sides of the first web 35 are rotatably supported. Therefore, when the second switch lever 215 is rotated, smooth rotation is possible with no unbalanced load applied to the first web 35.

Figure 12:
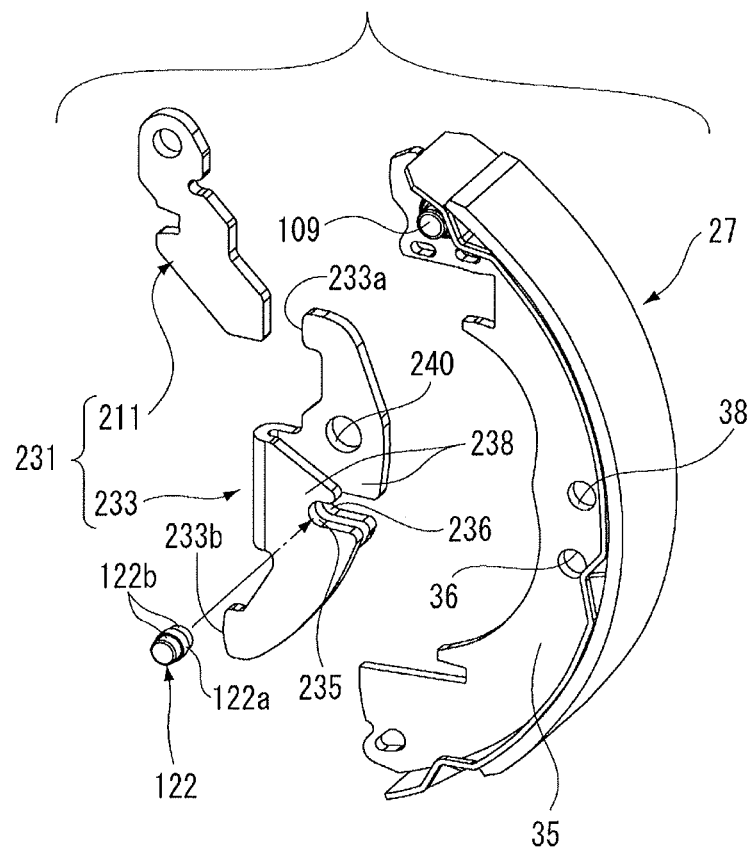
FIG. 12 is an exploded perspective view of main portions of a modification of a switch lever mechanism shown in FIG. 11.
Figure 13:
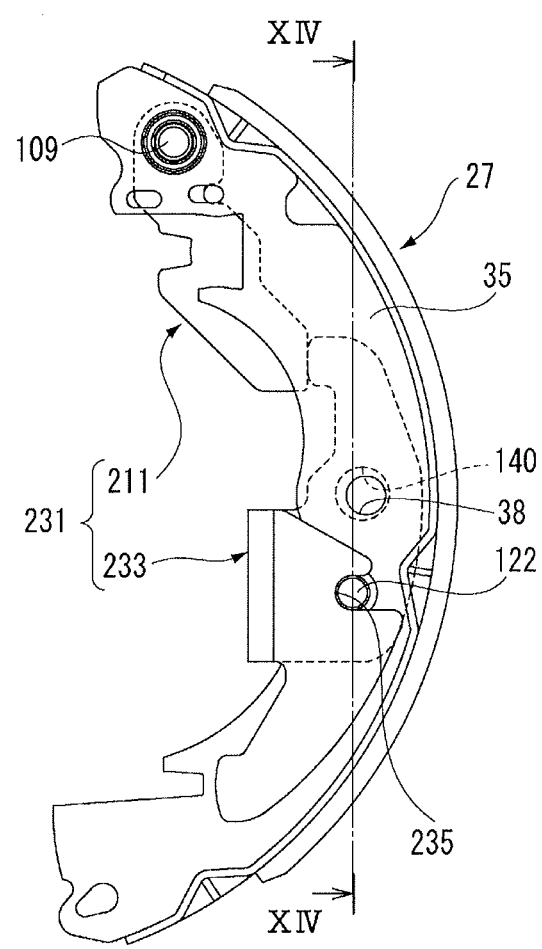
FIG. 13 is a front view of the assembled main portions of the switch lever mechanism shown in FIG. 12.
Figure 14:
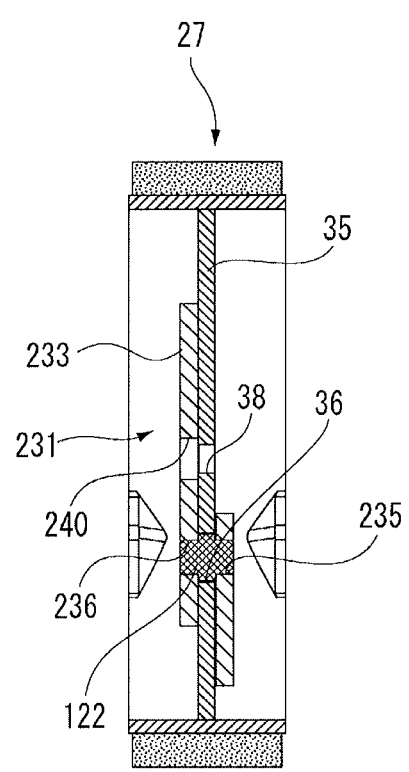
FIG. 14 is a section view taken along the arrow XIV-XIV of FIG. 13.
Figure 15:
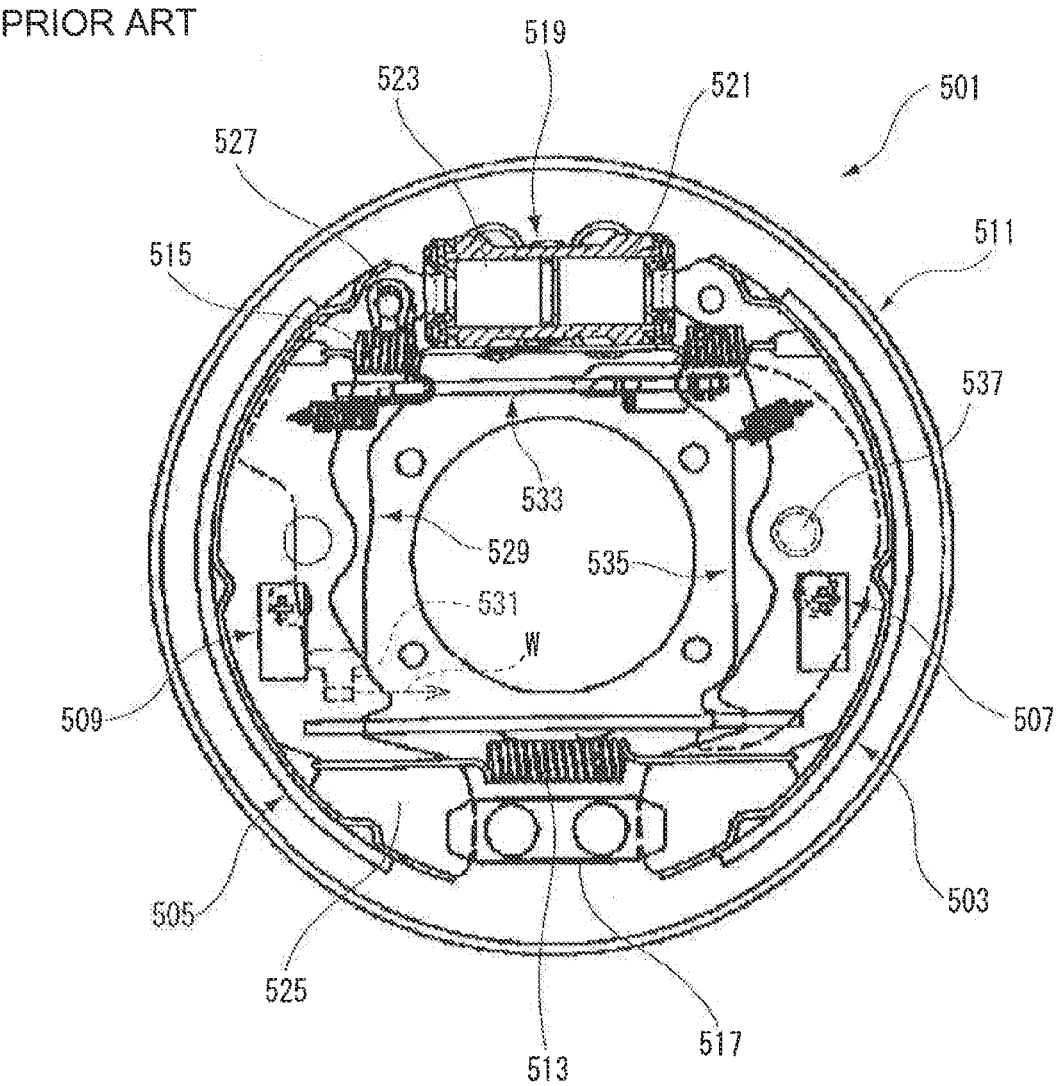
FIG. 15 is a front view of a conventional dual-mode drum brake apparatus.

Next, referring to FIGS. 12 to 14, description is given of a switch lever mechanism 231 according to a modification of the switch lever mechanism 213 of the second embodiment. Here, composing elements equivalent to those of the switch lever mechanism 213 are given the same designations and the duplicate description thereof is omitted.

As shown in FIGS. 12 and 13, the switch lever mechanism 231, which is rotatably mounted on the first brake shoe 27 and can be rotated by an action force of a given or higher value from the expansion mechanism 219, includes a first switch lever 211 and a second switch lever 233 which is rotatably supported by a second fulcrum pin 122 on the substantially middle portion of the first brake shoe 27 and can rotate following the first switch lever 211 to thereby serve as an output side.

The side end 233a contactable with the first switch lever 211 and side end 233b contactable with the switch strut 23 of the second switch lever 233 are bent formed such that they are disposed opposed to each other across the first web 35.

Thus, similarly to the switch lever mechanism 213, the first and second switch levers 211 and 233 constituting the switch lever mechanism 231 can be easily mounted onto the first web 35.

Further, the second switch lever 233 includes a pair of hold portions 238 bent formed for holding the first web 35 between them, and is rotatably supported on the first web 35 by a second fulcrum pin 122 inserted through the notch holes 235, 236 of the paired hold portions 238 and the support holes 36 of the first web 35.

Thus, similarly to the switch lever mechanism 213, when the second switch lever 233 is rotated, smooth rotation is possible with no unbalanced load applied to the first web 35.

As shown in FIGS. 12 and 14, the second fulcrum pin 122 is a stepped pin including a centrally-situated large diameter portion 122*a* and two small diameter portions 122*b* in its two end portions. The large diameter portion 122*a* has an outside diameter substantially equal to the inside diameter of the support hole 36 and an axial-direction width substantially equal to the plate thickness of the first web 35. The small diameter portions 122*b* each have an outside diameter substantially equal to the opening width of the notch holes 235, 236.

To mount the second switch lever 233 onto the first web 35, firstly, the large diameter portion 122*a* of the second fulcrum pin 122 is fitted into the support hole 36. Next, the paired hold portions 238 are mounted onto the first web 35 in such a manner that the small diameter portions 122*b* projected from the support holes 36 to the surface and back sides of the first web 35 are inserted from the opening end sides of the notch holes 235, 236.

After the switch lever 233 is mounted on the first web 35, since the shaft portion of the second shoe hold device 33 penetrating through the penetration hole 38 of the first web 35 is loosely fitted into the penetration hole 240, the switch lever 233 is rotatably supported by the second fulcrum pin 122 with its movement relative to the first web 35 restricted. In this case, since the axial-direction step section of the large diameter portion 122*a* of the second fulcrum pin 122 is locked to the inner edges of the notch holes 235, 236, there is eliminated the use of a removal preventive member such as the C clip 116 (see FIG. 14).

Next, description is given of the operation of the drum brake apparatus 210 having the above structure.

In the drum brake apparatus 210 of the second embodiment, when, before a parking operation state, a parking cable is pulled by the operation of an operation member (such as an operation lever) within a vehicle room, in the early stage of the pulling operation, the wheel-cylinder-13 side adjoining ends of the first and second brake shoes 27 and 29 are expanded first by the adjuster-equipped parking lever assembly 247, thereby determining the positions of these brake shoes.

Next, the wheel-cylinder-13 side adjoining ends of the brake shoes 27 and 29 expanded through the adjuster 217 are contacted with the inner peripheral surface of the brake drum and a reaction force from this inner peripheral surface acts on the brake shoes 27 and 29. When the action force (expansion force) of the expansion mechanism 219 reaches a given or higher level, the first switch lever 211 is rotated to press the second switch lever 215 (233). Thus, the second switch lever 215 (233) is rotated about the second fulcrum pin 113 (122) clockwise in FIG. 6. As a result, the second switch lever 215 (233) presses the second brake shoe 29 through the switch strut 23. Thus, the anchor-portion-15 side adjoining ends of the first and second brake shoes 27 and 29 are expanded and pressed against the inner peripheral surface of the brake drum.

In other words, until the reaction force from the inner peripheral surface of the brake drum acts on the first and second brake shoes 27 and 29 on their adjuster 217 installation sides, the switch lever mechanism 213 (231) constituted of the first and second switch levers 211 and 215 (233) provided for mode switching cannot be rotated by the expansion operations of the brake shoes 27 and 29 to be performed by the forward-pull type expansion mechanism 219 for parking braking, that is, the mode switch mechanism cannot be operated. Thus, after the wheel-cylinder-13 side adjoining ends of the first and second brake shoes 27 and 29 are expanded and contacted with the inner peripheral surface of the brake drum by the action force of the expansion mechanism 219, the anchor-portion-15 side adjoining ends of the brake shoes 27 and 29 are expanded and contacted with the inner peripheral surface of the brake drum by the switch lever mechanism 213 (231). This can enhance the adhesiveness of the brake shoes 27 and 29 to the drum slide surface.

Therefore, in the drum brake apparatus 210 of the second embodiment, after end of parking operation, the first and second brake shoes 27 and 29 are expanded on both of the wheel cylinder 13 side and anchor portion 15 side, thereby enhancing adhesiveness to the drum slide surface. As a result, in parking braking, a high parking brake force as a duo servo structure can be obtained and the loosened states of the brake shoes occurring when the parking brake force is generated can be prevented.

As described above, according to the drum brake apparatus of the invention, in both of the cross-pull type expansion mechanism 19 and forward-pull type expansion mechanism 219 differing in the parking cable pulling direction, a mode switch mechanism be added. Also, the cable mounting position of the backing plate 25 can be set at an ordinary position to thereby prevent such complicated shape of the backing plate as in the prior art and thus prevent a large increase in cost.

Here, the characteristics of the above-mentioned drum brake apparatus of the invention are summarized below.

[1] A drum brake apparatus 11, comprising: a pair of brake shoes (first and second brake shoes) 27, 29 disposed opposed to the inner peripheral surface of a brake drum and elastically supported on a backing plate 25 so as to be rotatable; a wheel cylinder 13 interposed between the one-side adjoining ends of the paired brake shoes (first and second brake shoes) 27, 29 for expanding the paired brake shoes (first and second brake shoes) 27, 29; an anchor portion 15 fixed to the backing plate 25 and contactable by the other-side adjoining ends of the paired brake shoes (first and second brake shoes) 27, 29; an adjuster 17 interposed between the one-side adjoining ends of the paired brake shoes (first and second brake shoes) 27, 29 existing near the wheel cylinder 13 for adjusting a shoe clearance; an expansion mechanism 19 disposed in series with the adjuster 17 and, on receiving an operation force, for expanding the paired brake shoes (first and second brake shoes) 27, 29 respectively; a switch lever mechanism 21 rotatably mounted on one brake shoe (first brake shoe) 27 and rotatable by an action force of a given or higher value applied from the expansion mechanism 19; and, a switch strut 23 interposed between the anchor side adjoining ends of the paired brake shoes (first and second brake shoes) 27, 29 and, following the rotation of the switch lever mechanism 21, for expanding the anchor side adjoining ends of the paired brake shoes (first and second brake shoes) 27, 29.

[2] The drum brake apparatus 210 having the [1] structure, wherein the switch lever mechanism 213 includes a first switch lever 211 rotatably supported on one brake shoe (first brake shoe) 27 by a first fulcrum pin 109 to serve as an input side, and a second switch lever 215 rotatably supported on one brake shoe (first brake shoe) 27 by a second fulcrum pin 113 and rotatable following the first switch lever 211 to serve as an output side rotatable following the first switch lever 211; and, the first switch lever 211 receives an action force from the expansion mechanism 219 between the slide contact point (second slide contact point) 229 of the first switch lever 211 and the second switch lever 215 and the first fulcrum pin 109.

[3] The drum brake apparatus 210 having the [2] structure, wherein the second switch lever 215 includes a pair of hold portions 218 bent formed for holding the first web 35 of the one brake shoe (first brake shoe) 27 therebetween, and the paired hold portions 218 are rotatably supported on the first web 35.

[4] The drum brake apparatus 210 having the [2] structure, wherein the side ends 233*a* and 233*b* of the second switch lever 215 respectively contactable with the first switch lever 211 and contactable with the switch strut 23 are bent formed so that they are disposed opposed to each other across the first web 35 of the one brake shoe (first brake shoe) 27.

[5] The drum brake apparatus 11, 210 having any one of the items [1] to [4] structures, wherein a drive mechanism (motor gear unit) 125 for pulling a parking cable 51 connected to the expansion mechanism 19 is provided on the back surface 101 of the backing plate 25.

Here, the drum brake apparatus of the invention is not limited to the above embodiments but it can be modified or improved properly. And, the materials, shapes, dimensions, number and positions of the respective composing elements of the above embodiments are arbitrary so long as they can attain the invention and thus are not limitative.

Also, the present application is based on the Japanese patent application (JPA No. 2012-165005) filed on Jul. 25, 2012 and the Japanese patent application (JPA No. 2013-105237) filed on May 17, 2013 and thus the contents thereof are incorporated herein for reference.

INDUSTRIAL APPLICABILITY

According to the drum brake apparatus of the invention, due to the dual-mode brake structure capable of functioning as a leading/trailing system in service braking and as a duo-servo system in parking braking, a dragging phenomenon otherwise caused by traveling vibrations in vehicle traveling or the like can be prevented, thereby being able to stabilize a brake force in service braking.

REFERENCE SIGNS LIST

11 drum brake apparatus
13 wheel cylinder
15 anchor portion
17 adjuster
19 expansion mechanism
21 switch lever mechanism
23 switch strut
25 backing plate
27 first brake shoe (brake shoe)
29 second brake shoe (brake shoe)
31 first shoe hold device
33 second shoe hold device
51 parking cable
101 back surface
109 first fulcrum pin
111 first switch lever
113 second fulcrum pin
115 second switch lever
125 motor gear unit (drive mechanism)
117 first slide contact point (slide contact point)
119 second slide contact point (slide contact point)
121 third slide contact point (slide contact point)

The invention claimed is:

1. A drum brake apparatus, comprising:
   a pair of brake shoes disposed opposed to an inner peripheral surface of a brake drum and elastically supported movably on a backing plate;
   a wheel cylinder interposed between a one-side adjoining ends of the paired brake shoes for expanding the paired brake shoes respectively;
   an anchor portion fixed to the backing plate and contactable by another-side adjoining ends of the paired brake shoes;
   an adjuster interposed between the one-side adjoining ends of the paired brake shoes existing near the wheel cylinder for adjusting a shoe clearance;
   an expansion mechanism arranged in series with the adjuster and, on receiving an operation force, for expanding the paired brake shoes respectively;
   a switch lever mechanism rotatably mounted on one of the brake shoes and rotatable by an action force of a given or higher value from the expansion mechanism; and
   a switch strut interposed between the anchor-portion side adjoining ends of the paired brake shoes and, following the rotation of the switch lever mechanism, for expanding the anchor-portion side adjoining ends of the paired brake shoes, wherein
   the switch lever mechanism includes a first switch lever rotatably supported on one of the brake shoes by a first fulcrum pin for serving as an input side, and a second switch lever rotatably supported on the one of the brake shoes by a second fulcrum pin for serving as an output side rotatable following the first switch lever; and
   the first switch lever receives an action force from the expansion mechanism between a slide contact point of the first swich lever and the second switch lever and the first fulcrum pin.

2. The drum brake apparatus according to claim 1, wherein
   the second switch lever includes a pair of hold portions bent formed for holding a first web of the one of the brake shoes therebetween, and the paired hold portions are rotatably supported on the first web.

3. The drum brake apparatus according to claim 1, wherein
   a side end of the second switch lever contactable with the first switch lever and a side end thereof contactable with the switch strut are bent formed so that they are disposed opposed to each other across the first web of the one of the brake shoes.

4. The drum brake apparatus according claim 1, wherein
   a drive mechanism for pulling a parking cable connected to the expansion mechanism is provided on a back surface of the backing plate.

* * * * *